United States Patent
Vogt

(10) Patent No.: US 9,840,029 B2
(45) Date of Patent: Dec. 12, 2017

(54) DEVICE FOR STORING AND MIXING BONE CEMENT

(71) Applicant: Heraeus Medical GmbH, Wehrheim (DE)

(72) Inventor: Sebastian Vogt, Erfurt (DE)

(73) Assignee: HERAEUS MEDICAL GMBH, Wehrheim (DE)

( * ) Notice: Subject to any disclaimer, the term of this patent is extended or adjusted under 35 U.S.C. 154(b) by 515 days.

(21) Appl. No.: 14/317,113

(22) Filed: Jun. 27, 2014

(65) Prior Publication Data
US 2015/0009775 A1    Jan. 8, 2015

(30) Foreign Application Priority Data
Jul. 8, 2013  (DE) .................. 10 2013 011 295

(51) Int. Cl.
 B29B 7/24    (2006.01)
 B29B 7/08    (2006.01)
 (Continued)

(52) U.S. Cl.
 CPC ............ *B29B 7/24* (2013.01); *B01F 11/0054* (2013.01); *B01F 11/0082* (2013.01);
 (Continued)

(58) Field of Classification Search
 CPC ............. B01F 15/0212; B01F 15/0279; B01F 15/0224; B01F 11/0082; B01F 11/0054;
 (Continued)

(56) References Cited

U.S. PATENT DOCUMENTS 3,144,966 A * 8/1964 Cook .................. B01F 7/00208
                                                            156/500
4,463,875 A * 8/1984 Tepic ................. A61B 17/8808
                                                            206/219
(Continued)

FOREIGN PATENT DOCUMENTS

CH   WO 2012174670 A1 * 12/2012   .......... B01F 11/0054
CN       1972648 A     5/2007
(Continued)

OTHER PUBLICATIONS

Chinese Office Action for corresponding Chinese Application No. 2014103232180 dated Mar. 3, 2016.
(Continued)

*Primary Examiner* — Timothy Cleveland
(74) *Attorney, Agent, or Firm* — Norris McLaughlin & Marcus, P.A.

(57) ABSTRACT

A device stores, mixes, and applies polymethylmethacrylate bone cement. The device comprises a first container for a first pasty component of the bone cement, a dispensing plunger arranged in the first container such that it can be shifted and serves for pressing the content of the first container out of a dispensing opening, a mixing facility for mixing the content of the first container, whereby the mixing facility is arranged in the first container and the mixing facility can be moved in the first container from outside for mixing, and at least one second container for at least one second component of the bone cement is arranged in or on said first container. The second container can be opened, such that the contents of the first container and second container can be mixed with each other in the first container, whereby at least a boundary surface of the first container is formed by a mobile volume compensation element.

20 Claims, 2 Drawing Sheets

Figure 1:
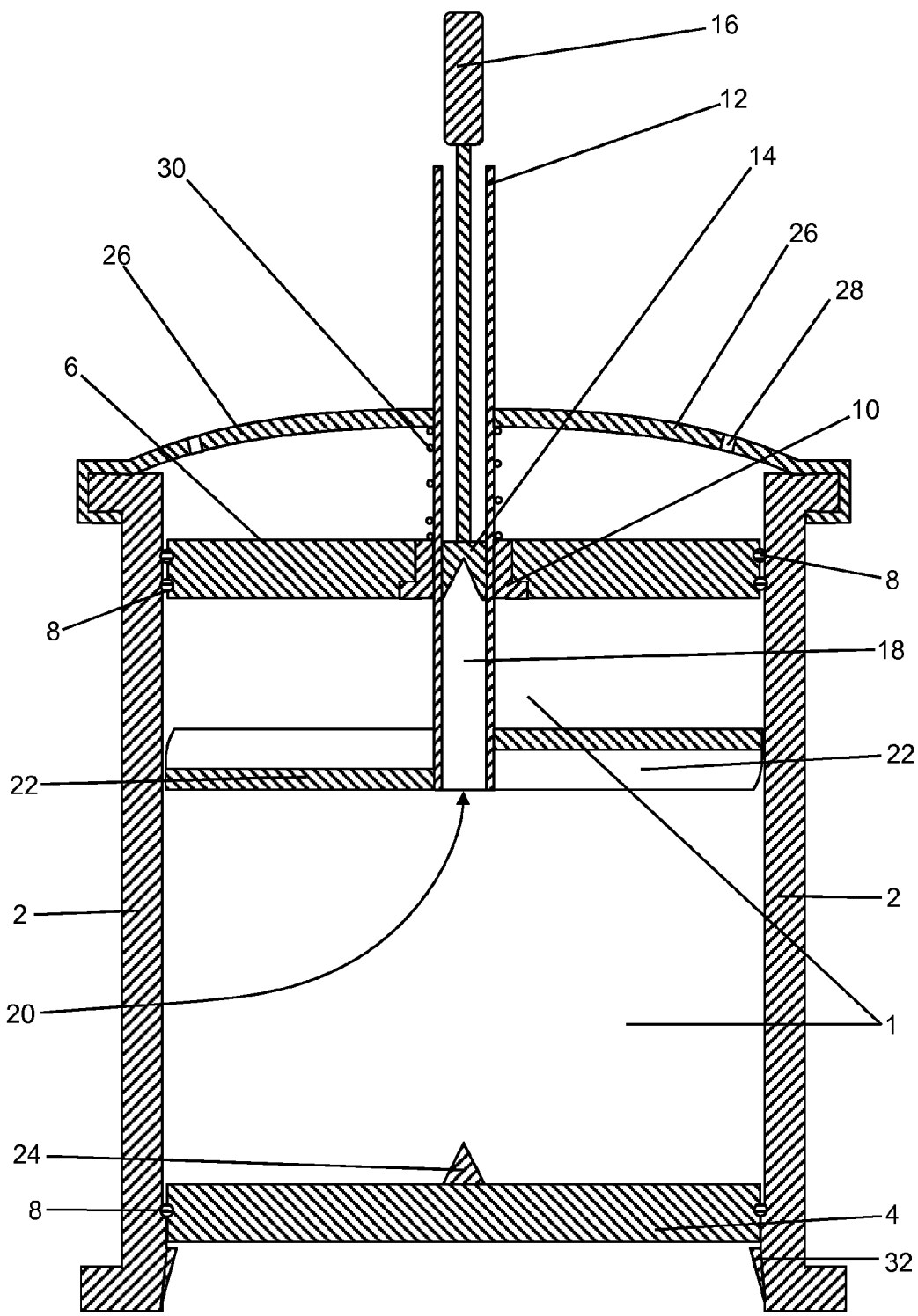

(51) Int. Cl.
    *B01F 11/00*     (2006.01)
    *B01F 13/00*     (2006.01)
    *B01F 15/02*     (2006.01)

(52) U.S. Cl.
    CPC ...... *B01F 13/0023* (2013.01); *B01F 15/0212* (2013.01); *B01F 15/0224* (2013.01); *B01F 15/0279* (2013.01); *B29B 7/08* (2013.01); *B01F 2215/0029* (2013.01)

(58) Field of Classification Search
    CPC ......... B01F 13/0023; B01F 2215/0029; B29B 7/24; B29B 7/08
    See application file for complete search history.

(56) References Cited

U.S. PATENT DOCUMENTS

| | | | |
|---|---|---|---|
| 5,551,778 | A | 9/1996 | Hauke et al. |
| 8,480,289 | B2 | 7/2013 | Merkhan et al. |
| 2004/0122359 | A1 | 6/2004 | Wenz et al. |
| 2005/0128868 | A1 | 6/2005 | de Vries |
| 2009/0105144 | A1 | 4/2009 | Vogt et al. |
| 2009/0105366 | A1 | 4/2009 | Vogt et al. |
| 2010/0046315 | A1 | 2/2010 | Merkhan et al. |
| 2013/0223181 | A1 | 8/2013 | de Vries et al. |
| 2014/0098629 | A1 | 4/2014 | Greter |
| 2014/0198601 | A1 | 7/2014 | Lidgren et al. |

FOREIGN PATENT DOCUMENTS

| | | |
|---|---|---|
| DE | 10242984 A1 | 3/2004 |
| DE | 102007052116 A1 | 4/2009 |
| DE | 102007050762 B3 | 5/2009 |
| DE | 102008030312 A1 | 1/2010 |
| EP | 2072114 A1 | 6/2009 |
| WO | 90/13264 A1 | 11/1990 |
| WO | 2004026377 A1 | 4/2004 |
| WO | 2011083095 A1 | 7/2011 |
| WO | 2012174670 A1 | 12/2012 |

OTHER PUBLICATIONS

Japanese Office Action for corresponding Japanese Application No. 2014-140370 dated May 25, 2015.
Australian Office Action for corresponding Australian Application No. 2014203503 dated Oct. 31, 2014.
European Search Report for corresponding EPO Application No. 14174628.9 dated Nov. 20, 2014.
Canadian Office Action for corresponding Canada Application No. 2,855,303, dated Jan. 14, 2016.
German Office Action for corresponding German Application No. 10 2013 011 295.8 dated Mar. 13, 2014.
Chinese Office Action for corresponding Chinese Application No. 2014103232180 dated Oct. 19. 2016.

\* cited by examiner

DEVICE FOR STORING AND MIXING BONE CEMENT

The invention relates to a device for storing, mixing and applying polymethylmethacrylate bone cement and a method for producing a polymethylmethacrylate bone cement using said device.

Accordingly, the subject matter of the invention is a device for storing and mixing polymethylmethacrylate bone cement that consists, during storage and prior to mixing, of a pasty component A and separate powdery or pasty component B, as well as a method for mixing component A and component B.

Polymethylmethacrylate bone cements (PMMA bone cements) have been in use in medicine for decades for permanent mechanical fixation of total joint endoprostheses. These are based on powder-liquid systems, whereby it is customary to use methylmethacrylate as monomer. Recently, polymethylmethacrylate bone cements that are based on the use of cement pastes have been proposed as well (DE 10 2007 050 762 B3, DE 10 2008 030 312 A1, DE 10 2007 052 116 A1). These bone cements have two cement pastes stored separately in suitable cartridges. These each contain components of a redox initiator system, aside from at least one monomer and suitable polymers.

Methylmethacrylate is the monomer used most commonly in polymethylmethacrylate bone cements. Redox initiator systems usually consist of peroxides, accelerators and, if applicable, suitable reducing agents. Radicals are formed only if all components of the redox initiator systems act in concert. For this reason, the components of the redox initiator system are arranged appropriately in the separate cement pastes such that these cannot trigger a radical polymerisation. The cement pastes are stable during storage. Only when the two cement pastes are mixed to produce a cement dough, the components of the redox initiator system, previously stored separately in the two pastes, react with each other forming radicals which trigger the radical polymerisation of the at least one monomer. The radical polymerisation then leads to the formation of polymers while consuming the monomer, whereby the cement dough is cured. It is customary to use static mixers for mixing the cement pastes and to attach them to the 2-component cartridges for this purpose.

When the two cement pastes are pressed out of the cartridges, the two cement pastes are pushed through a static mixer. The processes of pressing out and mixing thus proceed concurrently. Mixing the cement pastes in the static mixer requires a high pressing force since the pressure drop at the mixing elements in the static mixer is very high. It is therefore necessary to use powerful pneumatic or mechanical press-out devices to attain dispensation and mixing of the cement pastes. Said pneumatic or mechanical press-out devices are elaborate from a technical point of view and expensive. A less expensive option are the manually-operated press-out guns, which are customary with the polymethylmethacrylate bone cements based on powder-liquid systems, which are suitable for said cements, but are not sufficiently powerful for pressing-out and mixing bone cement pastes through the use of static mixers.

In conventional two-component cartridges, the volume ratio of component A to component B is 1:1, 1:2, and 1:10. The more the volumes of the components to be mixed through the use of static mixers differ, the more difficult it is to generate a homogeneously mixed bone cement paste. For this reason, very many mixing spirals are needed for larger volume ratios. The larger the number of mixing spirals needed, the larger is the pressure drop in the static mixer during the mixing process. One pasty component A needs to be present, whereas the second component B can be either liquid or powdery or pasty as well.

The Semkit® system is time-proven in the adhesives and sealants industry for many years. It involves storing a paste in a storage container. A second liquid component is present in a stirring rod, separated from the paste through a valve that is integrated into the stirring rod. Actuating the valve allows the liquid to flow into the paste which can then be mixed by hand.

Said system is disadvantageous, though, in that the valve system is suitable for viscous media only. The customary monomer of pasty polymethylmethacrylate bone cements, i.e. methylmethacrylate, cannot be separated permanently from the paste by this valve. Moreover, volume fluctuations arising during the axial mixing motions of the stirring rod in non-compressible pastes are compensated for in this system, firstly, in that the cartridges are soft and, secondly, in that the feed-through for the stirring rod is not absolutely tight such that mixed paste can exit and a small amount of air can also be drawn into the mixed paste. For pasty bone cements, solid cartridges of a stable shape are required, since the very viscous pasty polymethylmethacrylate bone cement can be pressed out of storage containers only through very large press-out forces. Moreover, with bone cements, it is not feasible to use a mixing system, in which an inadvertent exit of small amounts of paste takes place and in which there is the possibility that air is drawn into the paste. This would not only impair the cleanliness in the operating theatre, but also mechanically weaken the cement dough through the introduction of air since air bubbles act as fissure initiation sites in the cured cement and reduce the stability of the cured bone cement. Accordingly, the Semkit® system cannot be used for pasty polymethylmethacrylate bone cements.

Accordingly, it is the object of the invention to overcome the disadvantages of the prior art. In particular, an inexpensive device for storing and mixing polymethylmethacrylate bone cement is to be developed that can be used to store polymethylmethacrylate bone cement components while excluding air, whereby it shall be feasible, after mixing of the cement components, to dispense the cement dough with customary, inexpensive, manually-operated cementing guns. The mixing process must not be associated with any inadvertent leakage of cement dough and no air must be drawn into the cement dough due to volume fluctuations during the mixing process. The device shall also be suitable to ensure reliable mixing of the two pastes at a volume ratio of the pastes from 1:10 to 1:50 in order to obtain a homogeneous cement dough. Moreover, a method for mixing pasty polymethylmethacrylate bone cements through the use of the device to be developed is to be provided. The main component of the bone cement must be pasty.

The objects of the invention are met by a device for storing, mixing, and applying polymethylmethacrylate bone cement (PMMA bone cement) comprising a first container for a first pasty component of the bone cement, a dispensing plunger arranged in the first container such that it can be shifted and serves for pressing the content of the first container out of a dispensing opening, a mixing facility for mixing the content of the first container, whereby the mixing facility is arranged in the first container and the mixing facility can be moved in the first container from outside for mixing, and at least one second container for at least one second component of the bone cement is arranged in or on said first container, whereby the second container can be opened, such that the contents of the first container and second container can be mixed with each other in the first container, whereby at least a boundary surface of the first container is formed by a mobile volume compensation element.

A volume compensation element can preferably be implemented through one or two cylinders that are mobile in axial direction in the first container. Alternatively or in addition, a volume compensation element can just as well be formed through a flexibly deformable skin or membrane.

Devices according to the invention can be provided appropriately such that the dispensing plunger can be or is locked with respect to the first container, preferably on the end of the first container opposite from the dispensing opening.

The locking allows the dispensing plunger to be held when the first container is being degassed and sterilised.

A preferred embodiment of the invention proposes the mixing facility to be connected to a rod or a tube, whereby the rod or tube is mobile in axial direction through a gas-tight feed-through through a boundary of the first container such that the mixing facility can be moved through a motion of the rod or tube in order to mix the content of the first container, whereby the rod or tube preferably is suspended as in a bearing such that it can be rotated axially.

The mixing facility can be implemented through a plurality of mixing vanes. It is conceivable just as well that the mixing facility can be operated by means of a rod or tube and, in addition, comprises a separate or integrated magnetic stirring core.

By this means, the content can be mixed easily by hand.

Moreover, the invention can provide the dispensing opening to be closed and having to be opened before application of the mixed bone cement, whereby the dispensing opening preferably is a dispensing tube and the dispensing opening is arranged opposite from the dispensing plunger.

The invention can preferably provide the dispensing tube and/or the closure of the dispensing tube to be permanently connected to the mixing facility such that the mixing facility can be moved in the first container by means of the dispensing tube and/or the closure. It is particularly preferable to arrange a handle part for manual moving of the mixing facility at the dispensing tube and/or the closure.

This prevents air from being introduced. Moreover, the content of the containers is kept sterile by this means.

The invention can preferably provide the first container to comprise a cylindrical internal space, and the dispensing plunger in the internal space of the first container to be of a shape matching the footprint of the cylindrical internal space.

According to the scope of the invention, a cylindrical internal space shall be understood to mean a straight cylinder of any footprint, i.e. including a non-circular or non-round footprint. However, a cylindrical internal space having a circular footprint is preferred according to the invention. The dispensing plunger is then also cylindrical and touches against the walls of the cylindrical internal space of the first container by means of a seal. Preferably, a wiper is arranged on the side of the dispensing plunger facing the internal space and serves to prevent the mixed bone cement paste from being pushed past the dispensing plunger and from exiting on the rear of the device when the dispensing plunger is moved forward. The mixing facility having the circular cylinder geometry preferred according to the invention has mixing vanes that are equal in size or preferably slightly smaller than the internal diameter of the cylindrical internal space.

The cylindrical geometry with a circular footprint is the easiest for structural purposes. It is particularly preferred that the external surface of the first container also is cylindrical accordingly, and that at least 90% of the wall has an even thickness.

A preferred refinement of the invention can provide the second container to comprise a membrane, which can be punctured, for a boundary and a mandrel to be arranged in the first container and to be supported as in a bearing such as to be mobile with respect to the membrane such that the mandrel punctures through the membrane and thus opens the second container such that the content of the second container can be mixed with the content of the first container.

This structure allows the second container to be opened easily by mechanical means within the first container or at the edge thereof without having to be directly accessible from outside for this purpose. The opening mechanism is arranged within the structure for this purpose. Moreover, possible contamination or introduction of air during the opening process is prevented.

As an alternative to having a membrane, the invention can just as well provide that the second container comprises a plug as boundary surface on which a snap-in means is arranged, and that the second container having the snap-in means can be pushed onto an opposite snap-in means in the first container such that the snap-in means snap-locks with the opposite snap-in means. Subsequently, the plug can be detached by retracting the second container again. Preferably, the second container is arranged in a dispensing tube that can be slid in and pulled out axially through a feed-through in a boundary surface of the first container, whereby the plug closes the end of the dispensing tube facing the first container. In this context, the invention can particularly preferably provide the opposite snap-in means to be arranged on the dispensing plunger.

In this context, the invention can provide, in addition, that the dispensing opening is arranged in a dispensing tube, that the mandrel is arranged on the dispensing plunger, and that the second container has regions of the internal walls of the dispensing tube, a closure of the dispensing tube that is to be opened, and the membrane for its boundaries, whereby the dispensing tube is supported as in a bearing such as to be axially mobile in a feed-through through a boundary of the first container such that the dispensing tube including the membrane can be pressed onto the mandrel.

Using the dispensing tube as the second container is space-saving and also saves an additional mobile part on the inside of the first container. In this embodiment, no more than a single feed-through is required by means of which the second container can be opened against the first container and the mixing facility can be operated.

According to a preferred embodiment, the invention can provide at least one volume compensation element to be arranged in the first container such as to be mobile in axial direction, whereby the at least one volume compensation element preferably comprises a gas-tight feed-through through which a rod or tube is guided for operation of the mixing facility, particularly preferably through which the dispensing tube is guided for operating the mixing facility.

The corresponding structure is easy to realise and can therefore be implemented inexpensively.

According to another simplification, the invention can provide that a volume compensation element is implemented by means of the dispensing plunger and that the motion of the dispensing plunger out of the first container is limited by a boundary element, whereby the boundary element preferably is a snap-in means engaging an opposite snap-in means on the dispensing plunger.

Alternatively, the boundary element can just as well be provided by a union nut.

Using the dispensing plunger as volume compensation element is particularly simple because the dispensing plunger is to be mobile within the first container anyway and/or, more specifically, within the walls of the preferably cylindrical plastic body. Accordingly, same can also be used for volume compensation and no further mobile volume compensation element is required.

Preferably, the invention can provide a volume compensation element to be arranged opposite from the dispensing plunger in the first container as a cylindrical volume compensation element that is supported as in a bearing such as to be mobile, whereby the volume compensation element preferably comprises a gas-tight feed-through for a tube or a rod that is supported as in a bearing in the feed-through such as to be mobile.

Just as well, both of the afore-mentioned volume compensation elements can be implemented concurrently in the form of a first volume compensation element that is implemented by means of the dispensing plunger, and a second volume compensation element that is arranged in the first container opposite from the dispensing plunger as a cylindrical volume compensation element that is supported as in a bearing such as to be mobile. In addition, a deformable membrane could just as well be provided, theoretically, which also can take up a volume change of the first container due to the operation of the mixing facility. However, it is preferred to be limited to a single volume compensation element in order to simplify the structure.

Arranging the volume compensation element opposite from the dispensing plunger is advantageous in that its mobility can be fully matched to meet the requirements of a volume compensation element.

Moreover, the invention can provide a core as closure of the dispensing opening, whereby the core can be taken out of the dispensing opening, in particular out of the dispensing tube, whereby the core preferably comprises a receptacle for the mandrel, particularly preferably a receptacle fitting the mandrel.

The core being of the shape fitting the mandrel, the entire content can be pressed out of the second container if the receptacle forms the rear wall of the second container.

In this context, the invention can provide the core to comprise a wiper on the side facing the first container that wipes off powder or cement dough on the inside of the dispensing opening, in particular of the dispensing tube, when the core is being pulled out.

By this means, residues can be prevented from remaining in the tube and possibly becoming dissolved during dispensation and thus might impair the properties of the bone cement. As a result, it can be ensured that the bone cement dispensed early has the same properties as the bone cement dispensed at a later point in time.

Moreover, the invention can provide that at least one volume compensation element is supported as in a bearing through an elastic spring such as to be mobile with respect to the first container, whereby the spring pushes the volume compensation element into the internal space of the first container.

The spring supports the return motion of the volume compensation element. This reduces the forces on the seals and mobile parts of the device caused and transmitted through the also driving hydraulic forces through the bone cement dough and/or its components such that a less expensive structure with thinner materials and lower contact pressures can be implemented.

According to a preferred refinement, the invention can just as well provide the side with the dispensing tube to be closed by a closure cap comprising a feed-through for the dispensing tube that covers a volume compensation element and comprises at least one opening for enabling pressure equalisation between the surroundings and the intervening space between the closure cap and the covered volume compensation element, whereby, preferably, an elastic helical spring for pushing the volume compensation element into the internal space of the first container is arranged between the closure cap and the covered volume compensation element, whereby, particularly preferably, the helical spring is arranged about the dispensing tube.

By this means, impairment of the mobility by external influences (such as, for example, pressure or blockage of the volume compensation element) can be prevented.

The objects underlying the invention are also solved through a method for producing a polymethylmethacrylate bone cement using a device of this type, characterised by the steps of:

A) Providing the device, whereby the first container is filled with a first pasty component of the PMMA bone cement and the second container is filled with a second component of the PMMA bone cement, which preferably is liquid;

B) Opening the second container;

C) Mixing of the two components through moving the mixing facility, whereby moving the mixing facility is associated with a rod or tube connected to the mixing facility being pushed into and pulled out of the first container repeatedly, whereby the volume change of the content of the first container due to the sliding in and pulling out is compensated for through a motion of the at least one volume compensation element; and D) Applying the mixed bone cement through propelling the dispensing plunger forward in the first container.

In this context, the invention can provide the dispensing opening to initially be closed by a core and the core to be removed after step C).

The core seals the device with respect to the outside.

Moreover, for opening the second container, the invention can provide a dispensing tube containing the second container to be pushed onto a mandrel on the dispensing plunger and thus a membrane or a film/foil closing the second container to be punctured and the second container to be opened thus. This has the afore-mentioned advantages.

Moreover, the invention can provide the mixing facility to be connected to the dispensing tube and the content of the first container to be mixed by moving the mixing facility in the first container by moving the dispensing tube into and out of the first container, whereby, in addition, the mixing facility preferably is being rotated by rotating the dispensing tube in the first container.

As a result, it is easy to mix the components even under adverse conditions outside of a orderly operating theatre.

Moreover, the invention can provide the first container to be filled with a component of the bone cement before step A) and the inside of the first container to first be degassed and sterilised, whereby the dispensing plunger preferably is locked in place for this purpose.

This ensures the sterility of the content. This allows infections of the patient to be prevented.

The invention is based on the surprising finding that the use of at least one mobile volume compensation element allows a gas-tight device for the mixing of PMMA bone cement to be provided, in which no bone cement can exit from the device due to the volume changes occurring during the mixing process. Accordingly, this allows a very simple and inexpensive structure for the mixing of bone cement to be implemented, in which there is no danger of contaminating the surroundings with the bone cement and in which there also is no danger of air or gas becoming added to the bone cement during the mixing process, which would weaken the bone cement after it is cured.

Using a dispensing tube as actuation facility for the mixing facility and using the dispensing tube as container for the second component of the bone cement allows to forego additional components. This attains a further reduction of the cost.

It is essential to the invention that the first container contains a paste as first component. Moreover, the paste must not contain any air or gas inclusions and there also must be no supernatant gas phase in the first container. Any gas inclusion can lead to a reduction of the quality of the bone cement thus produced. Due to the paste being incompressible and compressible gas volumes being absent, the content of the first container is fully incompressible. Mixing by sliding in and pulling out a rod or tube to which the mixing facility is attached is feasible according to the invention only by means of the volume compensation element. Since the first container has rigid walls, the sliding in or pulling out of the rod or tube could not proceed otherwise.

In contrast to the simultaneous combination of the processes of pressing out and mixing through the use of static mixers, which is common with the pasty two-component polymethylmethacrylate bone cements, the rationale of the invention is therefore based on separating the processes of pressing out and mixing both in time and in space. This means that the pasty components are mixed with each other first and only then the cement dough thus formed is pressed out. The mixing is effected through a mixer to be operated manually in this context. By this means, the press-out force required for dispensing is low and manually operated inexpensive cementing guns can be used to press out the cement dough. Moreover, this also allows for homogeneous mixing of the pastes to be attained even if the pastes have a volume ratio from 1:10 to 1:30. It is essential to the invention to arrange a mobile volume compensation element, which can be used to compensate for volume fluctuations during the mixing process, without any cement dough exiting and without air being drawn into the cement dough.

An exemplary and, according to the invention, particularly preferred device for storing, mixing and applying polymethylmethacrylate bone cement is made up of a) a cylindrical storage container having a first space (container) for a pasty component A;
b) a slidable dispensing plunger that can be locked in place on one end of the cylindrical storage container;
c) a mandrel arranged on the inside of the dispensing plunger;
d) a dispensing tube;
e) a volume compensation element that is mobile in axial direction in the storage container and possesses a feed-through for a dispensing tube that is slidable in axial direction;
f) a first closure of the storage container on the end of the storage container opposite from the dispensing plunger;
g) a feed-through of the first closure for a dispensing tube that is slidable in axial direction with respect to the storage container;
h) a mixing facility that is attached at the end of the dispensing tube and is arranged in the space formed between the volume compensation element and the dispensing plunger;
i) a second closure of the dispensing tube to be opened by means of the mandrel, whereby the second closure is arranged on the end of the dispensing tube on which the mixer is situated;
j) a core arranged such as to be mobile in axial direction in the dispensing tube; and
k) a second space (container) for a component B that is formed by the dispensing tube, the closure of the dispensing tube, and the end of the mobile core pointing towards the inside.

Preferably, the device essentially consists of customary plastic materials for use in medicine, such as polypropylene, polyethylene, polyamide or other plastic materials suitable for application in medicine.

The dispensing tube having a mixer arranged on it and the core are based on a cementing system described in EP 2 072 114 B1 which is produced and distributed by the name of Palamix by Heraeus Medical GmbH (Wehrheim).

The second closure on the dispensing tube is preferably designed to be a membrane. Advantageously, the membrane and the dispensing tube and the mixer are injection-moulded together as a single part made from plastic material. As a result, the second space is safely closed with respect to the first space and the paste A and the methylmethacrylate monomer present therein cannot advance into the second space to reach component B. The membrane particularly preferably has a thickness of 10 µm to 500 µm.

The mandrel preferably is designed to be star-shaped or prism-shaped. As a result, the membrane can easily be cut open radially from the centre in appropriate manner such that, firstly, component B can be pressed into the first space to reach component A and such that, secondly, the membrane pieces still remain connected to the dispensing tube on one side such that these cannot be introduced into the cement dough after the mixing of paste A and component B during the dispensing through the dispensing tube.

According to the invention, the invention can provide the core to possess, on its end facing the second closure, a hollow space that can accommodate the mandrel. This means that the core can be flush with the dispensing tube and the mixer arranged on it such that the mixer can easily scrape off on the inside of the dispensing plunger while paste A and component B are being mixed. This prevents cement dough inhomogeneities.

The pasty component A is to be stored in the storage container in the absence of air. This means that there must be no gas phase above the pasty component A. As a result, there is no compressible medium that can compensate for increases and decreases in the volume upon the introduction of component B and during the mixing process due to the mixer being immersed and pulled out. It is absolutely mandatory to prevent paste from exiting and/or air from being aspirated into the paste during the mixing process.

It is therefore essential to the invention that a volume compensation element is implemented, which preferably is formed by a plunger that is mobile in axial direction in the storage container and possesses a recess for feed-through of the dispensing tube. The volume compensation element designed as a mobile plunger can compensate, through axial motion in the direction of the closure, for the volume increase between the dispensing plunger and the volume compensation element due to the introduction of component B into paste A and also the volume added by moving the dispensing tube in the direction of the dispensing plunger. When the dispensing tube moves in the direction of the closure, the decreasing volume between the dispensing plunger and the compensation element is compensated for by the volume compensation element moving in the direction of the dispensing plunger. As a result, mixing is feasible without air entering during the volume increase and without cement paste being able to exit during the temporary volume increase due to the associated pressure increase.

The invention can provide the volume compensation element to be secured from being displaced by means of a splint when the storage container is being filled, whereby the splint is removed after the filling process or before pasty component A is being mixed with component B.

In a further embodiment of the invention, the volume compensation element is formed by a membrane that can be deformed in axial direction and possesses a recess for feed-through of the dispensing tube.

It is essential for the function of the volume compensation element that the volume compensation element is positioned at a distance from the first closure by means of a spring resting on the first closure, whereby a helical spring that is guided around the dispensing tube is preferred for this purpose. The spring serves to return the volume compensation element back into its starting position after a temporary increase in volume and an ensuing motion of the volume compensation element in the direction of the closure. This means that no negative pressure is needed in the first space to be able to again reach the starting position of the volume compensation element.

For the function of the device, the invention can preferably provide the core to have a wiper at its side facing the second closure with the wiper wiping off powdered solids and pasty substances of component B on the inside of the dispensing tube.

The invention is also implemented by a method for mixing polymethylmethacrylate bone cement using the device according to the invention. In the device according to the invention, a cement paste A is situated in the first space and a component B, separated by means of a membrane, is situated in space B.

The method can be implemented, for example, through
a) moving the dispensing tube in the direction of the dispensing plunger, whereby the second closure hits against the mandrel and the action of the mandrel opens the second space, in which component B is stored;
b) subsequently moving the core axially in the direction of the second closure of the dispensing tube, whereby component B is pushed out of the second space into paste A, which is situated in the first space that has the storage container, the first closure, and the volume compensation element for its boundaries;
c) subsequently mixing component B and paste A to obtain cement dough C through axial and tangential motion of the dispensing tube including the mixer;
d) moving the dispensing tube, following successful mixing, in the direction of the closure such that the mixer touches against the inside of the volume compensation element;
e) subsequently pulling the core out of the dispensing tube and subsequently moving the dispensing plunger in the direction of the first closure, whereby cement dough C is being pressed out of the first space through the dispensing tube into the surroundings, and in that the volume changes of the first space are compensated for by axial motions of the volume compensation element in steps a) through c).

Figure 2:
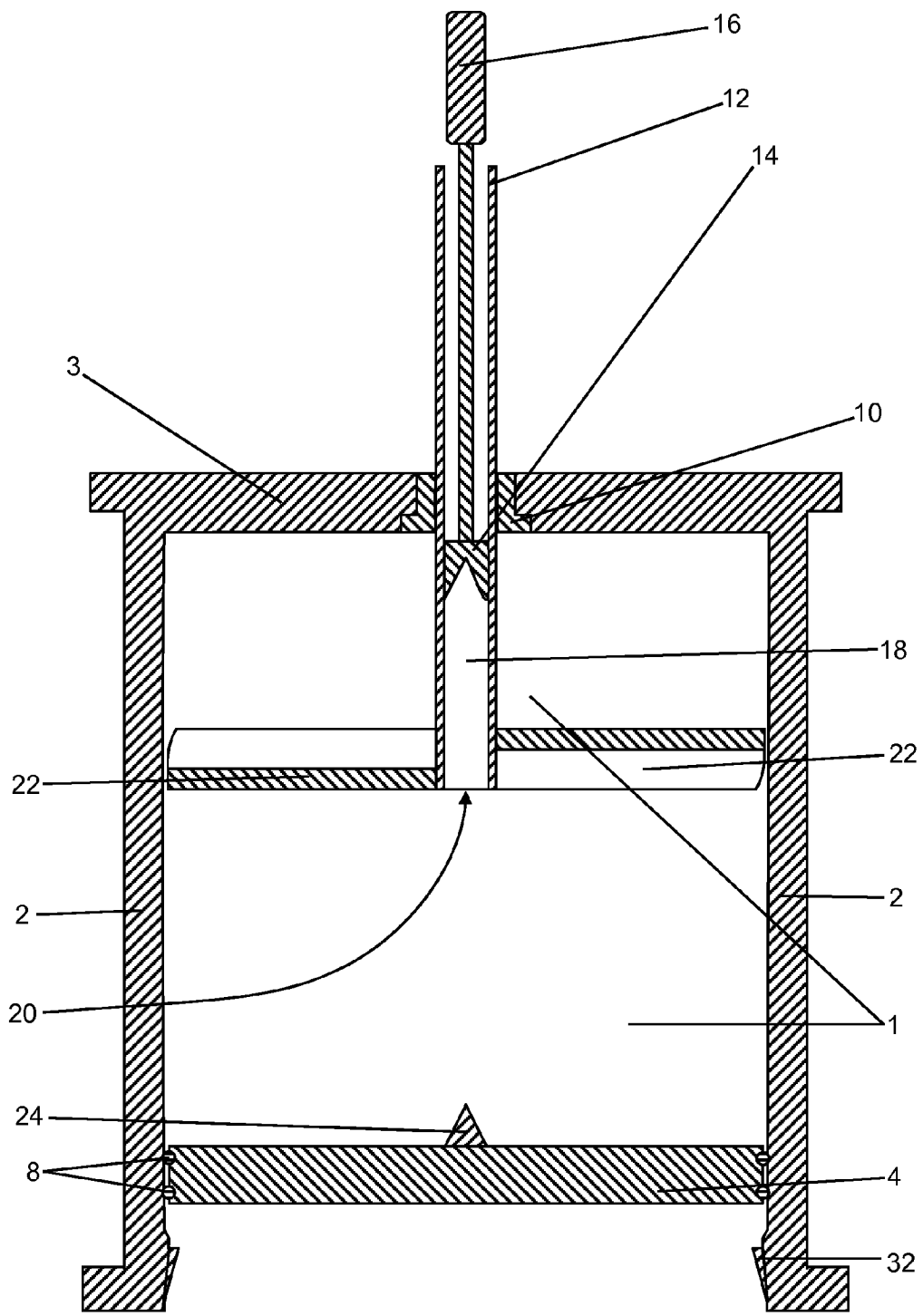

Further exemplary embodiments of the invention shall be illustrated in the following on the basis of two schematic figures, though without limiting the scope of the invention. In the figures:

FIG. 1: shows a schematic cross-sectional view of a device according to the invention having a volume compensation element on its front (top); and FIG. 2: shows a schematic cross-sectional view of another device according to the invention, in which a dispensing plunger serves as volume compensation element.

For simplification, identical or similar components are identified in the figures through the same reference numbers. Sectioned surfaces are shown by hatching.

FIG. 1 shows a schematic cross-sectional view of a device according to the invention. The device has a first container 1 with a cylindrical internal space that is or can be filled with a first component of a PMMA bone cement. The first container 1 contains a pasty mass containing methylmethacrylate monomer as first component. The first container 1 has on its sides the walls 2 of a cylindrical plastic body for its boundaries. On its rear (on the bottom in FIG. 1), the first container 1 has a cylindrical dispensing plunger 4 for its boundary. On its front (on the top in FIG. 1), the first container 1 has a volume compensation element 6 in the form of a cylindrical plunger for its boundary. The dispensing plunger 4 and the volume compensation plunger 6 are arranged in the walls 2 such as to be mobile in the direction of the cylinder axis (from top to bottom in FIG. 1) and are sealed in gas-tight manner with respect to the walls 2 by means of O-rings acting as seals 8.

The volume compensation plunger 6 has a feed-through with a guide sleeve 10 provided in it through which extends a cylindrical dispensing tube 12 having a dispensing opening. The dispensing tube 12 is arranged such as to be mobile along the cylinder axis and rotatable about the cylinder axis in the volume compensation plunger 6 and/or guide sleeve 10. The dispensing tube 12 is closed on its inside through a detachable core 14. The core 14 is connected to a handle part 16 through a rod that extends through the dispensing tube and the dispensing opening. The handle part 16 can be used to move the dispensing tube 12 through the guide sleeve 10 and thus through the dispensing tube 12 in the first container 1.

A second container 18 is arranged in the dispensing tube 12 below the core 14 and is closed on its underside (on the bottom in FIG. 1) by means of a film/foil 20 or a membrane 20. A second component of the bone cement is present in or can be filled into the second container 18. The second component is, for example, a liquid that leads to radical curing of the bone cement when it is mixed with the first component (methylmethacrylate dough). The two components are initially separated from each other by means of the membrane 20 and/or film/foil 20 and the dispensing tube 12.

Three mixing vanes 22 are arranged on the outside of the dispensing tube 12 and can be used to mix the content of the first container 1 by moving the dispensing tube 12 in the guide sleeve 10. The mixing vanes 22 thus form a mixing facility 22 for mixing the content of the first container 1. Presently, the mixing vanes 22 are inclined with respect to each other in the way of a propeller.

The inside cover surface of the dispensing plunger 4 has a mandrel 24 for puncturing the membrane 20 and/or film/foil 20 arranged on it. The second container 18 can be opened by pushing the dispensing tube 12 into the first container 1 until the membrane 20 and/or film/foil 20 is pushed onto the mandrel 24, which opens it. The mandrel 24 can be a cone, a pyramid or a multi-pronged star with edges for flanks in order to ensure that the membrane 20 and/or film/foil 20 is cut open or punctured to be open particularly well.

If the dispensing tube 12, according to an alternative embodiment, is equipped with a plug (not shown) with snap-in means instead of the membrane 20, an opposite snap-in means is provided on the dispensing plunger 4 instead of the mandrel 24 and engage the snap-in means of the plug and can then be pulled out of the dispensing tube 12 in order to open the second container 18.

The two components are present in the two containers 1, 18 in the absence of air inclusions and/or are introduced into them without any air or gas inclusions. Moreover, the interior of the containers 1, 18 is degassed and sterilised before being filled. Since there is no gas present on the inside of the first container 1, the content of the first container 1 is incompressible. Accordingly, the volume of the first container 1 changes when the dispensing tube 12 is pushed in or pulled out. The volume compensation can be effected through an axial motion of the volume compensation plunger 6 and/or through an axial motion of the dispensing plunger 4. As a result, the content of the first container 1 can be mixed without the content of the first container 1 exiting or air being drawn into the first container 1.

On the front (on the top in FIG. 1), the external cylindrical plastic body 2 is closed by means of a lid 26. Openings 28 are provided in said lid 26 to allow air to escape from the intervening space between the lid 26 and the volume compensation plunger 6. It is feasible to forego the openings 28 such that said intervening space can act as a gas spring. However, it is preferred to have a steel spring 30 arranged between the lid 26 and the volume compensation plunger 6 to act as a restoring element. When the volume compensation plunger 6 is being pushed in the direction of the lid 26 as a result of the dispensing tube 12 being slid into the first container 1, the steel spring 30 helps pushing the volume compensation plunger 6 back in the direction of the dispensing plunger 4, when the dispensing tube 12 is being pulled out of the first container 1 again.

The core 14 has a recess in the direction of the second container 18 that is a negative image of the mandrel 24. As a result, the mandrel 24 can be taken up into the recess when the core is being slid into the dispensing tube 12. For this purpose, the rod connecting the core 14 to the handle part 16 should be long enough (meaning longer than shown in the schematic depiction of FIG. 1). As a result, it can be made sure that the entire content of the second container 18 can be transferred into the first container. Providing a wiper lip (not shown) on the lower edge of the core 14 allows to make sure that the entire content of the second container 18 can be removed from the dispensing tube 12 without leaving any residues.

The underside of the plastic body 2 has snap-in elements 32 arranged on it which can be used to make sure that the dispensing plunger 4 cannot be pushed downwards, out of the plastic body 2. These are briefly sunk into the wall when the dispensing plunger 4 is slid in. A small projection leading to more pronounced compression of the seals 8 of the dispensing plunger 4 is also provided on the underside of the walls 2.

FIG. 2 shows a schematic cross-sectional view of another device according to the invention, in which the dispensing plunger 4 alone serves as volume compensation element. The structure of the device is identical to that according to FIG. 1 except for a few details.

The device according to FIG. 2 is devoid of a volume compensation plunger and a lid. Instead, the plastic body 2 is simply closed on the front (on the top in FIG. 2) and forms a cover wall 3 in this location. The volume compensation through sliding in and pulling out the dispensing tube 12 proceeds exclusively through an axial motion of the dispensing plunger 4 in the present case. There is no spring element acting as a restoring element in the present embodiment.

The dispensing plunger 4 presently is sealed with respect to the walls 2 in gas-tight manner through two seals 8. For all other reference numbers, please refer to the description of FIG. 1.

The structures according to FIGS. 1 and 2 are easy and inexpensive to produce from plastic materials by injection moulding technique.

The features of the invention disclosed in the preceding description and in the claims, figures, and exemplary embodiments, can be essential for the implementation of the various embodiments of the invention both alone and in any combination.

LIST OF REFERENCE NUMBERS

1 First container
2 Wall
3 Cover wall
4 Dispensing plunger
6 Volume compensation plunger/volume compensation element
8 Seal
10 Guide sleeve
12 Dispensing tube
14 Core
16 Handle part
18 Second container
20 Membrane/film/foil
22 Mixing vanes/mixing facility
24 Mandrel
26 Lid/closure
28 Opening
30 Steel spring
32 Snap-in means

I claim:
1. A device for storing, mixing, and applying polymethylmethacrylate bone cement, comprising:
    a first container for a first pasty component of the bone cement;
    a dispensing plunger arranged in the first container such that the dispensing plunger is shiftable for pressing a content of the first container out of a dispensing opening;
    a mixing facility for mixing the content of the first container, wherein the mixing facility is arranged in the first container and the mixing facility is movable in the first container from outside for mixing; and
    at least one second container, for at least one second component of the bone cement, arranged in said first container, wherein the second container is openable, such that contents of the first container and second container are mixable with each other in the first container, wherein at least a boundary surface of the first container is formed by a mobile volume compensation element, wherein the contents of the first container and second container are mixable by pushing a rod or a tube, that is connected to the mixing facility, into the first container and withdrawing the rod or the tube from the first container.

2. The device according to claim 1, wherein the dispensing plunger is lockable with respect to the first container, on an end of the first container opposite from the dispensing opening.

3. The device according to claim 1, wherein the rod or the tube is mobile in an axial direction through a gas-tight feed-through through a boundary of the first container such that the mixing facility is movable through a motion of the rod or the tube in order to mix the content of the first container, wherein the rod or the tube is suspended such that the rod or the tube is axially rotatable.

4. The device according to claim 3, wherein the dispensing opening of the first container is closed and has to be opened before application of the mixed bone cement, wherein the dispensing opening comprises the rod or the tube, and the dispensing opening is arranged opposite from the dispensing plunger.

5. The device according to claim 1, wherein the first container comprises a cylindrical internal space, and the dispensing plunger in the internal space of the first container is of a shape matching a footprint of the cylindrical internal space.

6. The device according to claim 1, wherein the at least one second container comprises a membrane, that can be punctured, for a boundary and a mandrel is arranged in the first container and is supported such as to be mobile with respect to the membrane such that the mandrel punctures through the membrane and thus opens the at least one second container such that a content of the at least one second container is mixable with the content of the first container.

7. The device according to claim 6, wherein the dispensing opening is arranged in the rod or the tube, in that the mandrel is arranged on the dispensing plunger, and in that the at least one second container is located adjacent internal walls of the rod or the tube, a closure of the rod or the tube that is openable, and the membrane for boundaries of the rod or the tube, whereby the rod or the tube is supported such as to be axially mobile in a feed-through through a boundary of the first container such that the rod or the tube including the membrane is pressable onto the mandrel.

8. The device according to claim 1, wherein the mobile volume compensation element is arranged in the first container such as to be mobile in an axial direction, whereby the mobile volume compensation element comprises a gas-tight feed-through through which the rod or the tube is guided for operation of the mixing facility.

9. The device according to claim 1, wherein motion of the dispensing plunger out of the first container is limited by a boundary element, wherein the boundary element is a snap-in means.

10. The device according to claim 1, wherein the mobile volume compensation element is arranged opposite from the dispensing plunger in the first container as a cylindrical volume compensation element that is supported such as to be mobile, wherein the volume compensation element comprises a gas-tight feed-through for the tube or the rod that is supported in the feed-through such as to be mobile.

11. The device according to claim 6, wherein a core is provided as closure of the dispensing opening, wherein the core can be taken out of the dispensing opening, whereby the core comprises a receptacle for the mandrel.

12. The device according to claim 11, wherein the core comprises a wiper on the side facing the first container that wipes off powder or cement dough on the inside of the dispensing opening if the core is being pulled from the first container.

13. The device according to claim 1, wherein the mobile volume compensation element is supported through an elastic spring such as to be mobile with respect to the first container, whereby the spring pushes the volume compensation element into the internal space of the first container.

14. The device according to claim 3, wherein a side with the rod or the tube is closed by a closure cap comprising a feed-through for the rod or the tube, that covers the mobile volume compensation element and comprises at least one opening for enabling pressure equalisation between at least one surroundings and an intervening space between the closure cap and the covered volume compensation element, wherein an elastic helical spring for pushing the volume compensation element into the internal space of the first container is arranged between the closure cap and the covered volume compensation element, wherein the helical spring is arranged about the rod or the tube.

15. A method for producing a polymethylmethacrylate bone cement using the device according to claim 1, the method comprising the steps of:
    A) providing the device, whereby the first container (1) is filled with the first pasty component of the bone cement and the second container is filled with the second component of the bone cement;
    B) opening the second container;
    C) mixing of the first and second components through moving the mixing facility, whereby moving the mixing facility is associated with the rod or the tube, that is connected to the mixing facility, being pushed into and pulled out of the first container repeatedly, whereby the volume change of the content of the first container due to the pushing in and pulling out is compensated for through a motion of the mobile volume compensation element; and
    D) applying mixed bone cement through propelling the dispensing plunger forward in the first container.

16. The method according to claim 15, wherein the dispensing opening is initially closed by a core and the core is removed after step C).

17. The method according to claim 15, wherein, for opening the second container, the rod or the tube containing the second container is pushed onto a mandrel on the dispensing plunger and thus a membrane or a film/foil closing the second container is punctured and the second container is opened.

18. The method according to claim 15, wherein the mixing facility is connected to the rod or the tube and the content of the first container is mixed by moving the mixing facility in the first container by moving the rod or the tube into and out of the first container, whereby, in addition, the mixing facility is being rotated by rotating the rod or the tube in the first container.

19. The method according to claim 15, wherein the first container is filled with the first component of the bone cement before step A) and the inside of the first container is first degassed and sterilised, wherein the dispensing plunger is locked in place.

20. A device for storing, mixing, and applying polymethylmethacrylate bone cement, comprising:
    a first container for a first pasty component of the bone cement;
    a dispensing plunger arranged in the first container such that the dispensing plunger is shiftable for pressing a content of the first container out of a dispensing opening;
    a mixing facility for mixing the content of the first container, wherein the mixing facility is arranged in the first container and the mixing facility is movable in the first container from outside for mixing; and at least one second container, for at least one second component of the bone cement, arranged in said first container, wherein the second container is openable, such that contents of the first container and second container are mixable with each other in the first container, wherein at least a boundary surface of the first container is formed by a mobile volume compensation element, wherein motion of the dispensing plunger out of the first container is limited by a boundary element located opposite with respect to the first container, wherein the boundary element is a snap-in means.

* * * * *